(12) United States Patent
Burd

(10) Patent No.: US 11,927,136 B1
(45) Date of Patent: Mar. 12, 2024

(54) TURBOFAN ENGINE WITH PRECOOLER

(71) Applicant: RAYTHEON TECHNOLOGIES CORPORATION, Farmington, CT (US)

(72) Inventor: Steven W. Burd, Cheshire, CT (US)

(73) Assignee: RTX CORPORATION, Farmington, CT (US)

( * ) Notice: Subject to any disclaimer, the term of this patent is extended or adjusted under 35 U.S.C. 154(b) by 7 days.

(21) Appl. No.: 17/742,786

(22) Filed: May 12, 2022

Related U.S. Application Data

(60) Provisional application No. 63/197,029, filed on Jun. 4, 2021.

(51) Int. Cl.
| *F02C 7/143* | (2006.01) |
| *F02C 3/04* | (2006.01) |
| *F02C 7/04* | (2006.01) |
| *F02C 7/18* | (2006.01) |

(52) U.S. Cl.
CPC ............ *F02C 7/143* (2013.01); *F02C 3/04* (2013.01); *F02C 7/04* (2013.01); *F02C 7/18* (2013.01); *F05D 2240/35* (2013.01); *F05D 2260/20* (2013.01)

(58) Field of Classification Search
CPC .... F02C 3/04; F02C 7/224; F02C 7/04; F02C 7/143; F02C 9/18; F02C 7/057; F02K 7/16; F02K 3/00; F02K 3/02; F02K 3/025; F02K 3/06; F02K 3/11; B64C 30/00; F05D 2260/213; F05D 2220/323; F05D 2220/36
See application file for complete search history.

(56) References Cited

U.S. PATENT DOCUMENTS

| 3,308,626 A * | 3/1967 | Nelson | F02K 9/78 60/39.511 |
| 3,705,496 A * | 12/1972 | Wolf | F02K 3/02 60/768 |
| 5,165,227 A * | 11/1992 | Grieb | F02K 1/08 239/265.17 |
| 9,810,153 B2 | 11/2017 | Bond et al. | |
| 11,383,852 B2 * | 7/2022 | Razak | F02C 7/143 |
| 2007/0119150 A1 * | 5/2007 | Wood | F02C 7/042 60/226.1 |

(Continued)

FOREIGN PATENT DOCUMENTS

| CN | 107701312 | 11/2020 |
| GB | 1022952 | 3/1966 |

*Primary Examiner* — Craig Kim
(74) *Attorney, Agent, or Firm* — SNELL & WILMER L.L.P.

(57) ABSTRACT

A gas turbine engine includes a core engine, including a compressor section, a combustor section and a turbine section positioned within a core flow path of the gas turbine engine; a bypass splitter positioned radially outward of the core engine and configured to house the compressor section, the combustor section and the turbine section; a bypass duct positioned radially outward of the bypass splitter; a fan section positioned axially upstream of the compressor section, the fan section including a fan and an inlet cone positioned upstream of the fan; an inlet duct configured to house the fan section; an inlet precooler disposed within the inlet duct; and a heat exchange system configured to provide a cooling fluid to the inlet precooler.

18 Claims, 10 Drawing Sheets

(56) References Cited

U.S. PATENT DOCUMENTS

| | | | |
|---|---|---|---|
| 2008/0217481 A1* | 9/2008 | Janeke | B64G 1/62 |
| | | | 244/171.1 |
| 2013/0305686 A1* | 11/2013 | Conrardy | F02K 7/16 |
| | | | 60/226.1 |
| 2015/0048208 A1* | 2/2015 | Janeke | B64C 1/0009 |
| | | | 244/130 |
| 2017/0167382 A1* | 6/2017 | Miller | B64D 15/06 |
| 2018/0057171 A1* | 3/2018 | Sautron | F02C 9/18 |
| 2020/0386189 A1* | 12/2020 | Powell | F02K 3/11 |
| 2022/0144438 A1* | 5/2022 | Ho | B64D 13/06 |
| 2022/0231551 A1* | 7/2022 | Kupiszewski | H02K 9/19 |
| 2023/0022809 A1* | 1/2023 | Smith | F02C 7/18 |

* cited by examiner

TURBOFAN ENGINE WITH PRECOOLER

CROSS-REFERENCE TO RELATED APPLICATIONS

This Application claims priority to, and the benefit of, U.S. Provisional Application No. 63/197,029 filed on Jun. 4, 2021, and titled "Turbofan Engine with Precooler," which is incorporated by reference herein in its entirety for all purposes.

FIELD

The present disclosure relates generally to gas turbine engines and, more particularly, to turbofan gas turbine engines having precoolers to facilitate operation in flight regimes of varying speed.

BACKGROUND

Gas turbine engines of the turbofan type typically include a fan section, a compressor section, a combustor section and a turbine section. The fan section drives air along a bypass flow path while the compressor section drives air along a core flow path. In general, during operation, air is pressurized in the compressor section and is mixed with fuel and burned in the combustor section to generate hot combustion gases. Efficient and thorough mixing and combustion of the fuel and air is often facilitated using swirlers disposed upstream of a combustion zone where burning of the fuel and air occurs. Subsequent to combustion, the hot combustion gases flow through the turbine section, which extracts energy from the hot combustion gases to power the compressor section and other gas turbine engine loads, such as those required to rotate fan blades in the fan section. The compressor section typically includes low-pressure and high-pressure compressors, and the turbine section includes low-pressure and high-pressure turbines.

Operation of turbofan engines at high speeds presents many challenges not present during operation at lower speeds. One such challenge concerns management of the thermal energy generated by shock waves associated with the compressibility of the air at the higher speeds. As speeds increase, the dynamic temperature of the air entering at the engine increases rapidly. A potential solution to such a thermal challenge involves the positioning of one or more precoolers downstream of a shock structure and upstream of the fan section of a turbofan engine. The precooler, when coupled with a heat exchanger, may function to cool the inlet air entering the fan section to temperatures more similar to those encountered during operation at lower flight speeds.

SUMMARY

A gas turbine engine is disclosed. In various embodiments, the gas turbine engine includes a core engine, including a compressor section, a combustor section and a turbine section positioned within a core flow path of the gas turbine engine; a fan section positioned axially upstream of the compressor section, the fan section including a fan and an inlet cone positioned upstream of the fan; an inlet duct configured to house the fan section; an inlet precooler disposed within the inlet duct; and a heat exchange system configured to provide a cooling fluid to the inlet precooler.

In various embodiments, the inlet precooler is a substantially flat structure positioned a fixed distance upstream of the inlet cone. In various embodiments, the inlet precooler includes a radially inner portion that surrounds a radially outer portion of the inlet cone. In various embodiments, the inlet precooler includes a cone-shaped structure, the cone-shaped structure defining an angle with respect to a radially extending plane positioned perpendicular to an engine central longitudinal axis. In various embodiments, the angle is within a first range of about zero degrees to about sixty degrees. In various embodiments, the angle is within a second range of about ten degrees to about fifty degrees.

In various embodiments, the heat exchange system includes a cooling circuit having a cold loop and a hot loop and a compressor configured to deliver a cooled cooling fluid to the inlet precooler and a heat exchanger configured to receive a heated cooling fluid from the inlet precooler and to produce the cooled cooling fluid via a heat exchange process. In various embodiments, the heat exchange system includes a cooling circuit having a cold loop and a hot loop and a compressor configured to deliver a cooled cooling fluid to the inlet precooler and a turbogenerator configured to receive a heated cooling fluid from the inlet precooler and to produce the cooled cooling fluid via an expansion of the heated cooling fluid over a turbine section of the turbogenerator.

In various embodiments, the gas turbine engine includes a high-speed spool and the compressor section includes a high-pressure compressor and the turbine section includes a high-pressure turbine, the high-pressure compressor and the high-pressure turbine being interconnected via the high-speed spool. In various embodiments, the gas turbine engine includes a low-speed spool and the compressor section includes a low-pressure compressor and the turbine section includes a low-pressure turbine, the low-pressure compressor and the low-pressure turbine being interconnected via the low-speed spool.

In various embodiments, the cooling fluid comprises a supercritical fluid or a transcritical fluid is circulated through the inlet precooler via a pump. In various embodiments, the cooling fluid is selected to cool an inlet airstream to the inlet precooler to a temperature consistent with subsonic flight while flying at a supersonic speed. In various embodiments, the cooling fluid is selected to cool the inlet airstream to the inlet precooler to about negative forty degrees Celsius at an altitude of about ten-thousand meters.

A turbofan engine is disclosed. In various embodiments, the turbofan engine includes a core engine, including a compressor section, a combustor section and a turbine section positioned within a core flow path of the turbofan engine; a bypass splitter positioned radially outward of the core engine and configured to house the compressor section, the combustor section and the turbine section; a bypass duct positioned radially outward of the bypass splitter; a fan section positioned axially upstream of the compressor section, the fan section including a fan and an inlet cone positioned upstream of the fan; an inlet duct configured to house the fan section; an inlet precooler disposed within the inlet duct; and a heat exchange system configured to provide a cooling fluid to the inlet precooler, wherein the inlet precooler includes a radially inner portion that surrounds a radially outer portion of the inlet cone.

In various embodiments, the inlet precooler includes a cone-shaped structure, the cone-shaped structure defining an angle with respect to a radially extending plane positioned perpendicular to an engine central longitudinal axis. In various embodiments, the angle is within a range of about zero degrees to about sixty degrees.

In various embodiments, the heat exchange system includes a cooling circuit having a cold loop and a hot loop and a compressor configured to deliver a cooled cooling fluid to the inlet precooler and a heat exchanger configured to receive a heated cooling fluid from the inlet precooler and to produce the cooled cooling fluid via a heat exchange process. In various embodiments, the heat exchange system includes a cooling circuit having a cold loop and a hot loop and a compressor configured to deliver a cooled cooling fluid to the inlet precooler and a turbogenerator configured to receive a heated cooling fluid from the inlet precooler and to produce the cooled cooling fluid via an expansion of the heated cooling fluid over a turbine section of the turbogenerator.

In various embodiments, the cooling fluid comprises a supercritical fluid or a transcritical fluid is circulated through the inlet precooler via a pump. In various embodiments, the cooling fluid is selected to cool an inlet airstream to the inlet precooler to a temperature consistent with subsonic flight while flying at a supersonic speed.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
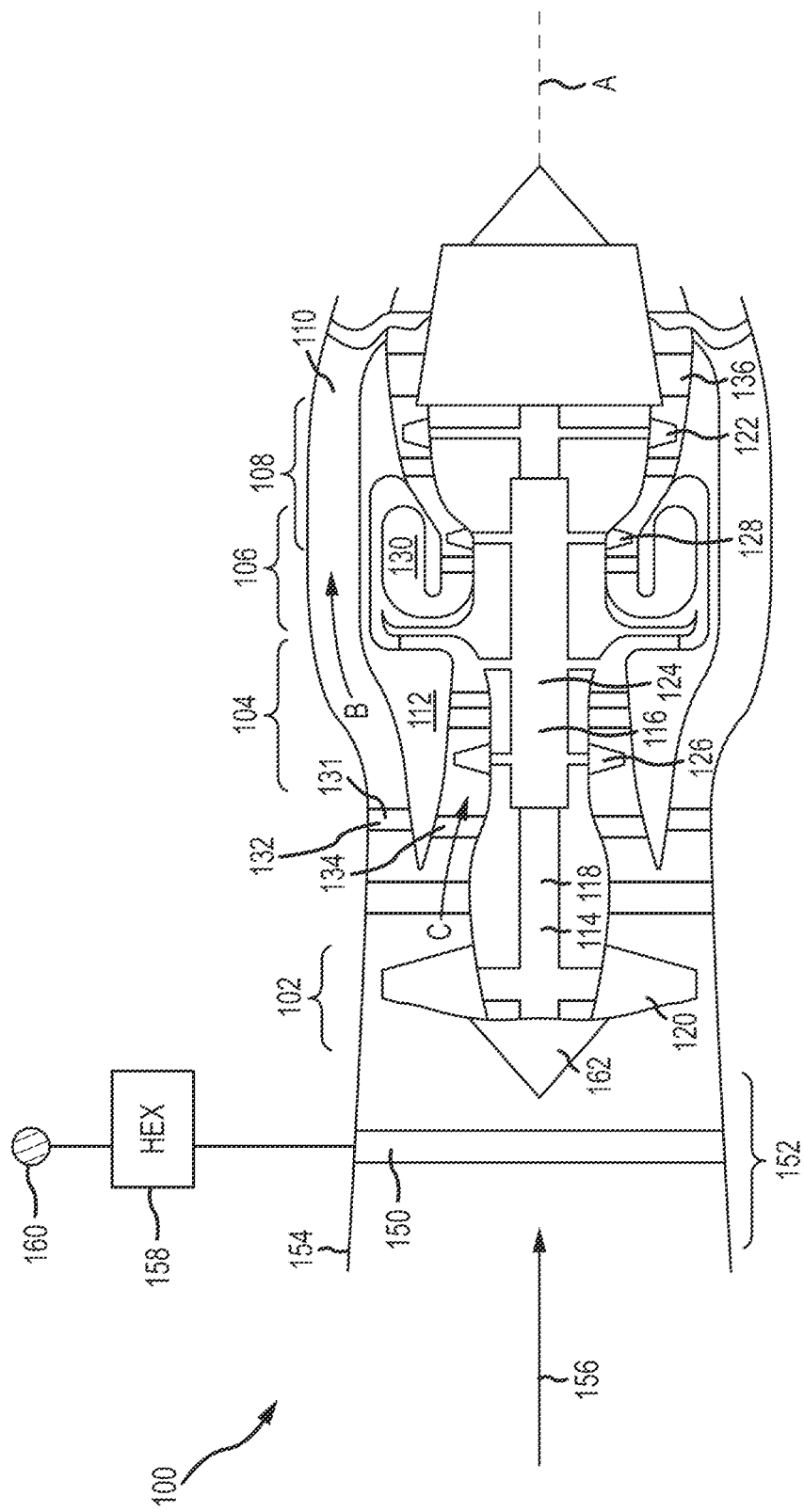
FIG. 1A is a cross sectional schematic view of a gas turbine engine, in accordance with various embodiments.

Referring now to the drawings, FIG. 1A provides a cross-sectional schematic view of a turbofan engine 100, in accordance with various embodiments. The turbofan engine 100 is disclosed herein as a two-spool turbofan engine that generally incorporates a fan section 102, a compressor section 104, a combustor section 106 and a turbine section 108. The compressor section 104 (and to some extent the fan section 102) drives air along a core flow path C for compression and communication into the combustor section 106 and then expansion through the turbine section 108. The fan section 102 is configured to drive a bypass flow B (typically air) through a bypass duct 110. In general, the bypass duct 110 is defined by an annular space disposed radially outside a bypass splitter 112, which also encloses and provides a housing for the core engine components (e.g., the compressor section 104, the combustor section 106 and the turbine section 108) of the turbofan engine 100.

The turbofan engine 100 is depicted as a two-spool configuration, which includes a low-speed spool 114 and a high-speed spool 116 mounted for rotation about an engine central longitudinal axis A. The low-speed spool 114 generally includes an inner shaft 118 that interconnects the fan section 102 (or a fan 120) to a low-pressure turbine 122. In various embodiments, the fan 120 may function as a low-pressure compressor to the core flow path C. The high-speed spool 116 generally includes an outer shaft 124 that interconnects a high-pressure compressor 126 (depicted as an axial compressor coupled to a centrifugal compressor) and a high-pressure turbine 128. A combustor 130 is arranged between the high-pressure compressor 126 and the high-pressure turbine 128. The inner shaft 118 and the outer shaft 124 are concentric and rotate about the engine central longitudinal axis A, which is collinear with longitudinal axes of the inner shaft 118 and the outer shaft 124. The air in the core flow path C is compressed by the fan 120 and then the high-pressure compressor 126, mixed and burned with fuel in the combustor 130, and then expanded over the high-pressure turbine 128 and the low-pressure turbine 122. The low-pressure turbine 122 and the high-pressure turbine 128 rotationally drive, respectively, the low-speed spool 114 (and the fan 120) and the high-speed spool 116 (and the high-pressure compressor 126) in response to the expansion.

During operation, the core engine components drive the fan 120. As the fan 120 rotates, the bypass flow B (typically air) is driven through the bypass duct 110, providing a thrust component in a direction aft of the engine. In various embodiments, the turbofan engine 100 includes a variable strut 131 (e.g., a fan exit variable vane) to manage or regulate one or both of the bypass flow B and the core flow C. In various embodiments, for example, the variable strut 131 may comprise separately operated struts, including a bypass flow variable strut 132 and a core flow variable strut 134. An aft engine strut 136 may also be included to manage or regulate the core flow C as it exits the turbofan engine 100 as a hot exhaust stream, which may also be used to provide a thrust component is a direction aft of the engine.

With continued reference to FIG. 1A, the turbofan engine 100 includes an inlet precooler 150. In various embodiments, the inlet precooler 150 is positioned within an inlet section 152 of an inlet duct 154 (which may include a nacelle or a portion of the fuselage of an aircraft where the nacelle is merged into the fuselage), though which an inlet airstream 156 is provided to the turbofan engine 100. As illustrated, the inlet precooler 150 is positioned upstream of the fan 120 and is generally configured to cool the inlet airstream 156 prior to entering the fan section 102. In various embodiments, the inlet precooler 150 is operably connected to a heat exchanger 158 (HEX), which is configured to provide a cooling fluid to the inlet precooler 150. In various embodiments, the cooling fluid is a supercritical fluid or a transcritical fluid that may be circulated through the inlet precooler 150 via a pump 160 configured to pump such fluids. In various embodiments, the supercritical or transcritical fluids may comprise refrigerants, carbon dioxide, ammonia, hydrogen, helium or the like having thermal characteristics or properties suitable to absorb the thermal energy generated by the shock wave structure existing upstream of the inlet precooler 150. In various embodiments, for example, the cooling fluid is selected to cool the inlet airstream 156 to a temperature consistent with subsonic flight at a given altitude, such as, for example, a temperature equal to about negative forty degrees Celsius (−40° C.) (≈−40° F.) at an altitude of about ten-thousand meters (10,000 meters) (=32,800 feet) while operating at a supersonic speed.

During operation, the inlet airstream 156, which may be assumed to have passed through a shock wave structure existing forward of or even partially within the inlet section 152, exhibits a relatively high temperature, characteristic of the temperature of an air stream flowing downstream of a normal or oblique shock wave structure. The inlet airstream 156 passes through the inlet precooler 150, reducing the temperature of the inlet airstream 156. The inlet airstream 156 then enters the fan section 102 where rotation of the fan 120 drives the inlet airstream 156 into the duct structures surrounding the core flow C and the bypass flow B, enabling the turbofan engine 100 to generate thrust as described above.

Figure 1B:
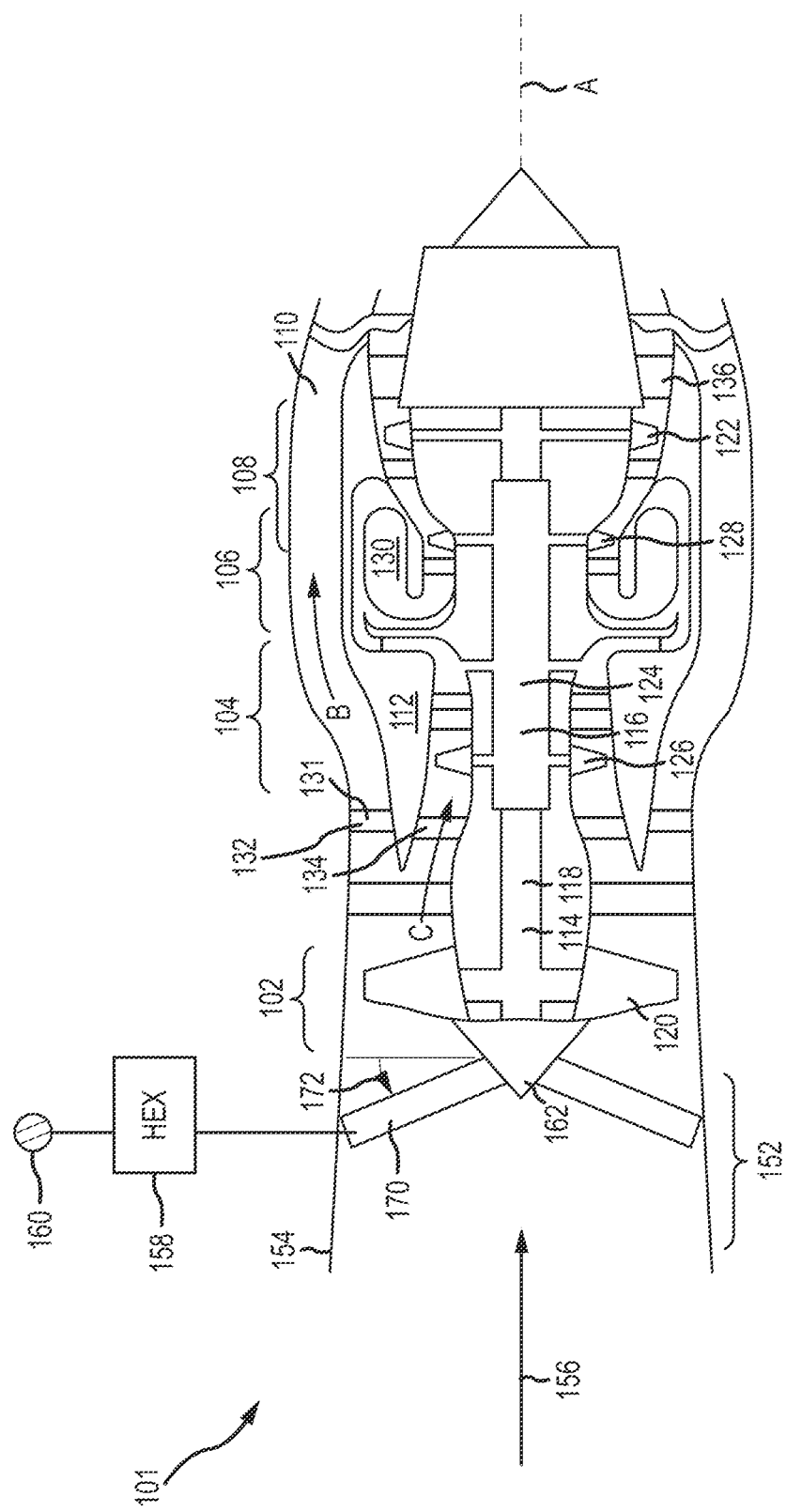
FIG. 1B is a cross sectional schematic view of a gas turbine engine, in accordance with various embodiments.
Figure 1C:
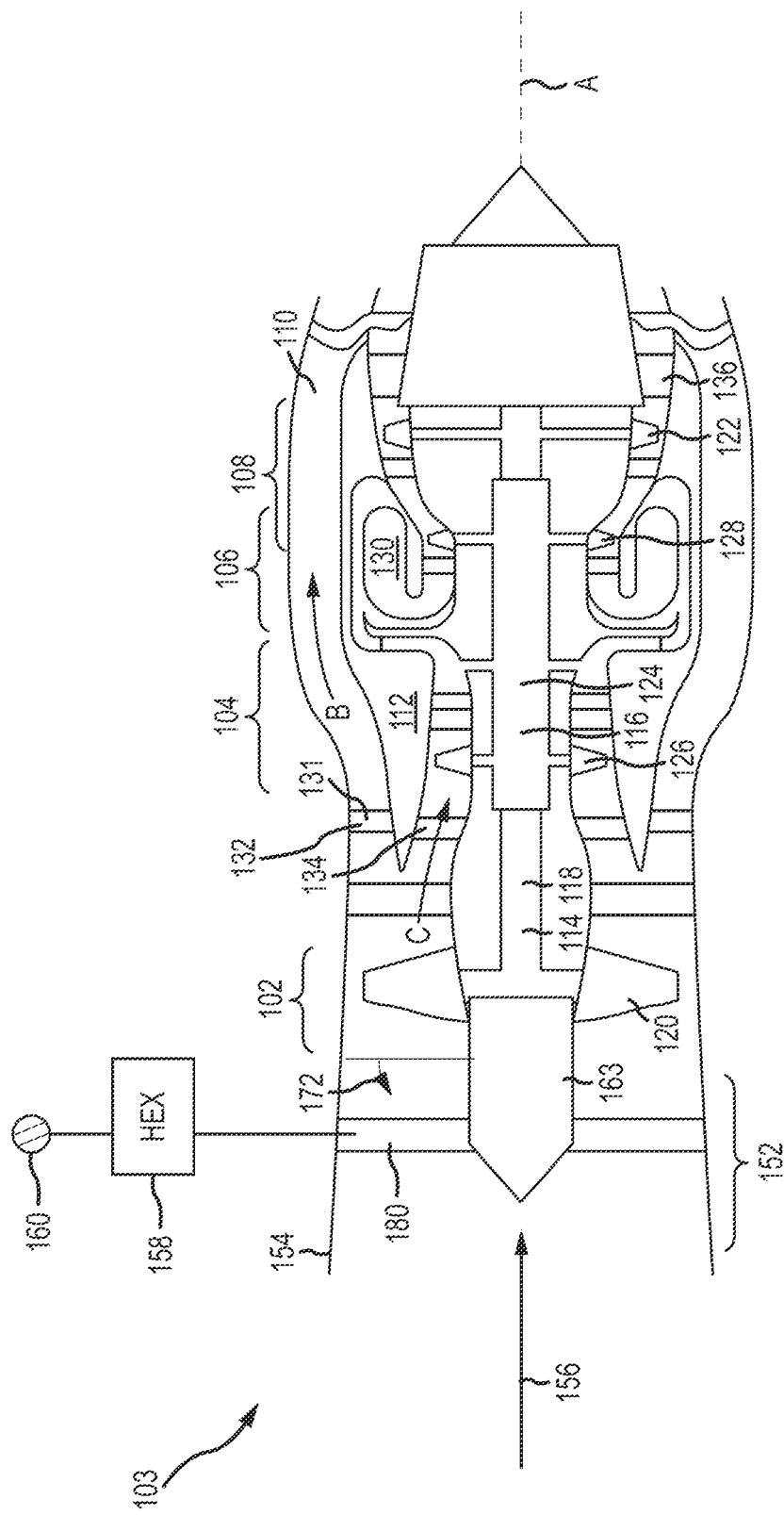
FIG. 1C is a cross sectional schematic view of a gas turbine engine, in accordance with various embodiments.

In various embodiments, as illustrated in FIG. 1A, the inlet precooler 150 comprises a linear or substantially flat structure—e.g., a circular- or square-shaped flat structure, depending on the shape of the inlet duct 154—that is positioned a fixed distance upstream of an inlet cone 162, which may be considered part of the fan section 102 and attached to the fan 120. The disclosure, however, contemplates other shapes of inlet precoolers, so the embodiment illustrated at FIG. 1A should not be considered limiting. In various embodiments, the inlet precooler 150 is positioned in a plane that is perpendicular to the direction of the incoming flow. In various embodiments, the inlet precooler 150 is position perpendicular to the direction of the central longitudinal axis A and forward of the engine 100. Referring to FIG. 1B, for example, a turbofan engine 101 having an inlet precooler 170 is illustrated. The turbofan engine 101 includes the same two-spool configuration described above with reference to the turbofan engine 100 illustrated at FIG. 1A, so the detailed description of the core engine components and bypass duct configuration is not repeated here. As illustrated, the inlet precooler 170 comprises a cone-shaped structure that extends from proximate the inlet cone 162 upstream within inlet section 152 until contacting the walls of the inlet duct 154. As further illustrated, the inlet precooler 170 includes a radially inner portion (or axially downstream portion) that surrounds a radially outer portion of the inlet cone 162. The cone-shaped structure of the inlet precooler 170 extends upstream within the inlet section 152 at an angle 172 which, in various embodiments, is within a first range of about zero degrees (0°) to about sixty degrees (60°), is within a second range of about ten degrees (10°) to about fifty degrees (50°), is within a third range of about twenty degrees (20°) to about forty degrees (40°) or is within a fourth range of about twenty-five degrees (25°) to about thirty-five degrees (35°). The angle 172 is with respect to a radially extending plane positioned perpendicular to the engine central longitudinal axis A. Referring now to FIG. 1C, an additional embodiment illustrating the various contemplated configurations of inlet precoolers is provided. For example, as illustrated, a turbofan engine 103 having an inlet precooler 180 is illustrated. The turbofan engine 103 includes the same two-spool configuration described above with reference to the turbofan engine 100 illustrated at FIG. 1A, so the detailed description of the core engine components and bypass duct configuration is not repeated here. As illustrated, the inlet precooler 180 comprises a linear or substantially flat structure, similar to the inlet precooler 150 described above, but that is disposed about a portion of an inlet cone 163 and at a fixed location within the inlet section 152. Note the disclosure contemplates the inlet precooler 180 to include the about zero degree (0°) limit of the first range of the inlet precooler 170 described above with reference to FIG. 1B.

Operation of the inlet precooler 170 and the inlet precooler 180 is the same as that described above with reference to the inlet precooler 150 and so is not repeated here. However, the various shapes and positioning of the inlet precoolers described in reference to FIGS. 1A, 1B and 1C may accommodate different geometries and positioning of the normal and oblique shock wave structures that arise during operation of the turbofan engines when in flight. For example, shock wave structures that extend further into the inlet section 152 may benefit from the inlet precooler being positioned further aft within the inlet section 152 or oriented within the ranges of the angle 172 described above to avoid interaction between the shock wave structure and the inlet precooler—e.g., the inlet precooler 170 or the inlet precooler 180.

Referring now to FIGS. 2A, 2B, 2C, 2D and 2E, various cooling circuits (or a heat exchange system) that may be employed with a turbofan engine having a precooler are illustrated, in accordance with various embodiments. The disclosure relating to FIGS. 2A-2E refers generally to the turbofan engine 100 and to the inlet precooler 150 described above with reference to FIG. 1A to describe the cooling circuits, but, without loss of generality, the same constructional and operational principles described with reference to the turbofan engine 100 and to the inlet precooler 150 apply equally to the turbofan engine 101 and to the inlet precooler 170 described with reference to FIG. 1B and to the turbofan engine 103 and to the inlet precooler 180 described with reference to FIG. 1C. Further, the constructional and operational details of the turbofan engine 100 (and the turbofan engine 101 and the turbofan engine 103) have been described in detail above and so are not repeated here.

Figure 2A:
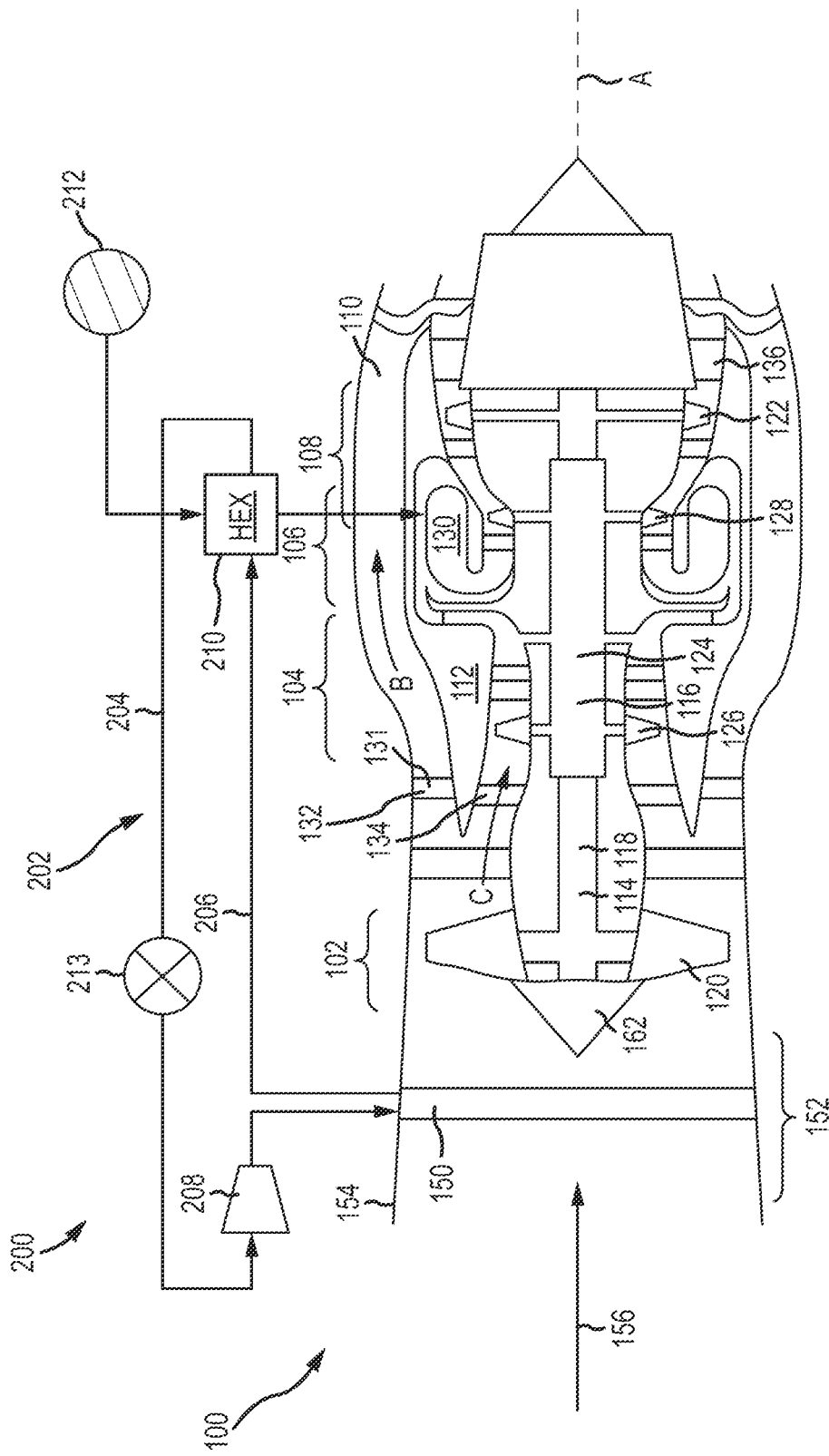
FIGS. 2A, 2B, 2C, 2D, and 2E are cross sectional schematic views of a gas turbine engine, illustrating various cooling circuits for a precooler, in accordance with various embodiments.

Referring now to FIG. 2A, a cooling circuit 200 for the inlet precooler 150 is illustrated. In various embodiments, the cooling circuit 200 includes a cooling fluid loop 202 having a cold loop 204 and a hot loop 206. A compressor 208

(or a pump, which may be electrically or mechanically driven) is configured to deliver a cooled cooling fluid from the cold loop 204 to the inlet precooler 150, where the cold cooling fluid is heated by the thermal energy of the inlet airstream 156 to produce a heated cooling fluid via a heat exchange process. The heated cooling fluid is then pumped by the compressor 208 to a heat exchanger 210 where the heated cooling fluid is cooled to produce the cooled cooling fluid. The heat exchanger 210 is configured to cool the heated cooling fluid to the cooled cooling fluid via a heat exchange process between the heated cooling fluid and a fuel (or oil) from a tank 212 (e.g., a fuel tank within the wing of an aircraft) that is being delivered to the combustor 130. The heat exchange process beneficially preheats the fuel being delivered to the combustor 130 while cooling the heated cooling fluid to the cooled cooling fluid for return to the inlet precooler 150. The configuration of the cooling circuit 200 is a closed loop circuit, with the cooling fluid being a supercritical or transcritical fluid as described above. Note that in various embodiments, a flow control device 213 (e.g., an expansion valve) may be added to the cooling circuit 200 to enhance cooling of the cooling fluid before being returned to the inlet precooler 150.

Figure 2B:
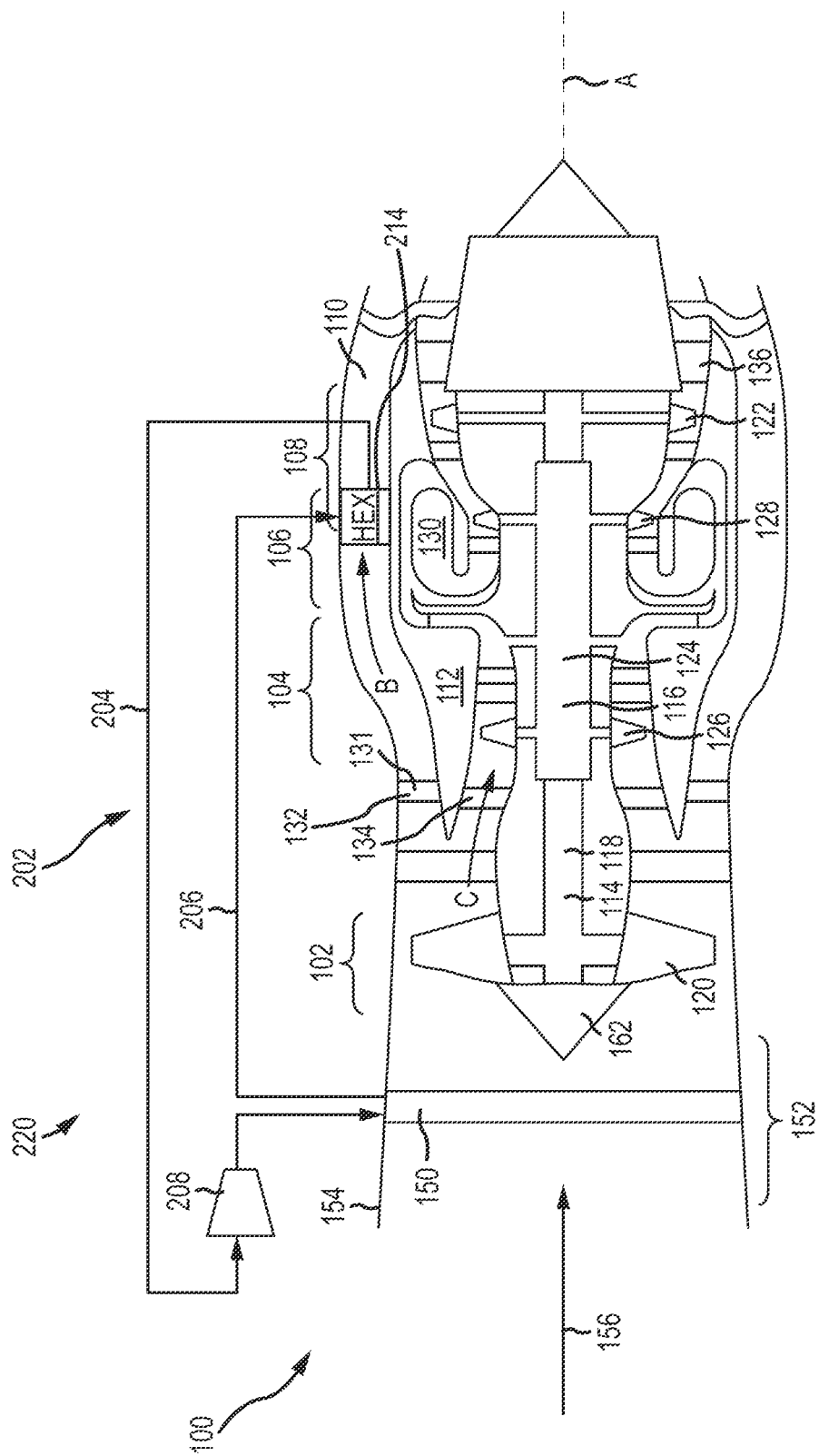

Referring now to FIG. 2B, a cooling circuit 220 for the inlet precooler 150 is illustrated. In various embodiments, the cooling circuit 220 includes the cooling fluid loop 202 having the cold loop 204 and the hot loop 206. The compressor 208 is configured to deliver the cooled cooling fluid from the cold loop 204 to the inlet precooler 150, where the cold cooling fluid is heated by the thermal energy of the inlet airstream 156 to produce the heated cooling fluid via a heat exchange process. The heated cooling fluid is then pumped by the compressor 208 to a heat exchanger 214 where the heated cooling fluid is cooled to produce the cooled cooling fluid. The heat exchanger 214 is configured to cool the heated cooling fluid to the cooled cooling fluid via a heat exchange process between the heated cooling fluid and a bypass airstream being forced by the fan 120 through the bypass duct 110. The configuration of the cooling circuit 220 is essentially a closed loop circuit, with the cooling fluid being a supercritical or transcritical fluid as described above.

Figure 2C:
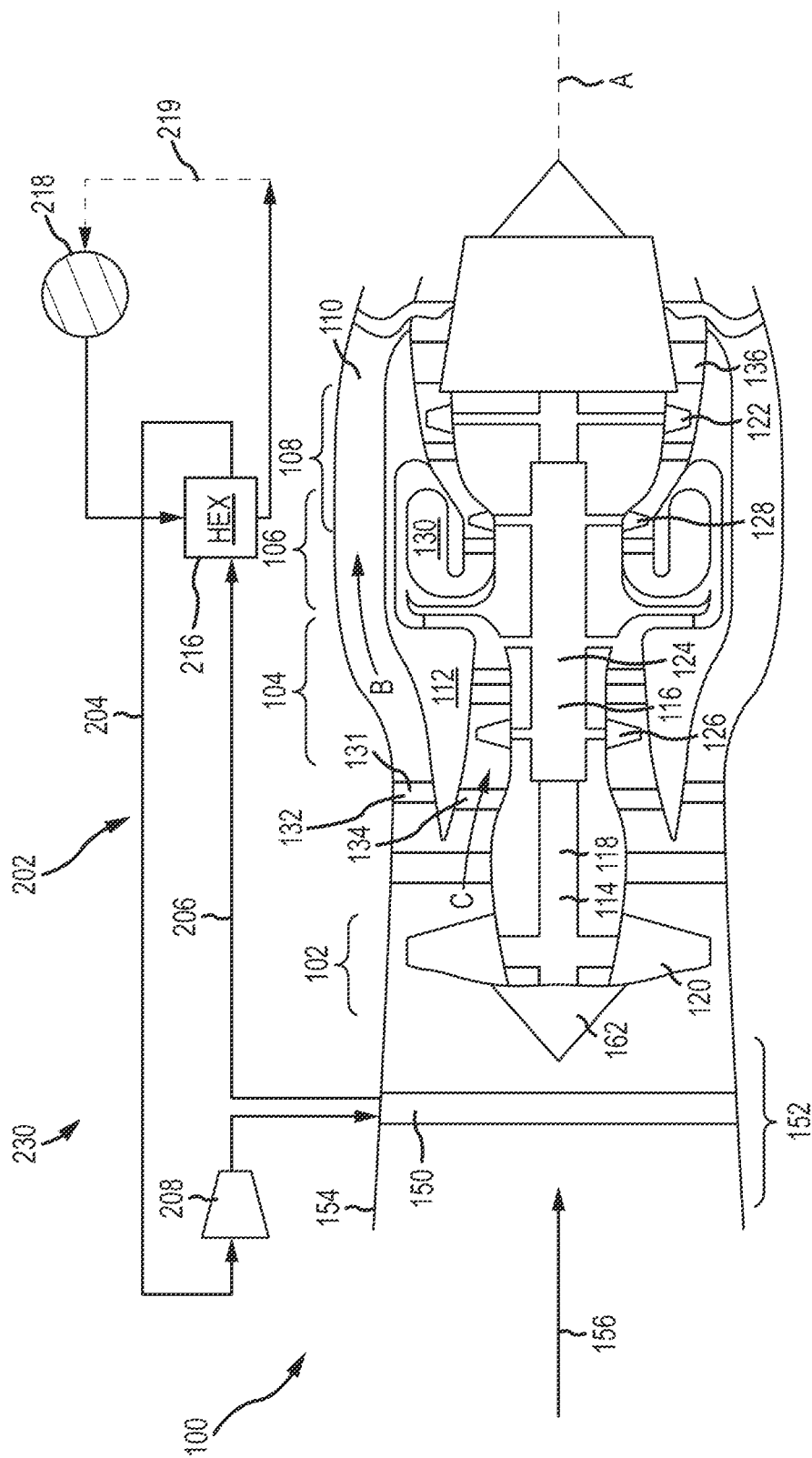

Referring now to FIG. 2C, a cooling circuit 230 for the inlet precooler 150 is illustrated. In various embodiments, the cooling circuit 230 includes the cooling fluid loop 202 having the cold loop 204 and the hot loop 206. The compressor 208 is configured to deliver the cooled cooling fluid from the cold loop 204 to the inlet precooler 150, where the cold cooling fluid is heated by the thermal energy of the inlet airstream 156 to produce the heated cooling fluid via a heat exchange process. The heated cooling fluid is then pumped by the compressor 208 to a heat exchanger 216 where the heated cooling fluid is cooled to produce the cooled cooling fluid. The heat exchanger 216 is configured to cool the heated cooling fluid to the cooled cooling fluid via a heat exchange process between the heated cooling fluid and an aircraft cooling fluid (e.g., a refrigerant or a polyalphaolefin oil) being delivered from an aircraft fluid source 218 (which may include auxiliary equipment and a pump) on the aircraft. Following the heat exchange process in the heat exchanger 216, the aircraft cooling fluid may be returned to the aircraft fluid source 218 via a return circuit 219. The configuration of the cooling circuit 230 is essentially a closed loop circuit, with the cooling fluid being a supercritical or transcritical fluid as described above.

Figure 2D:
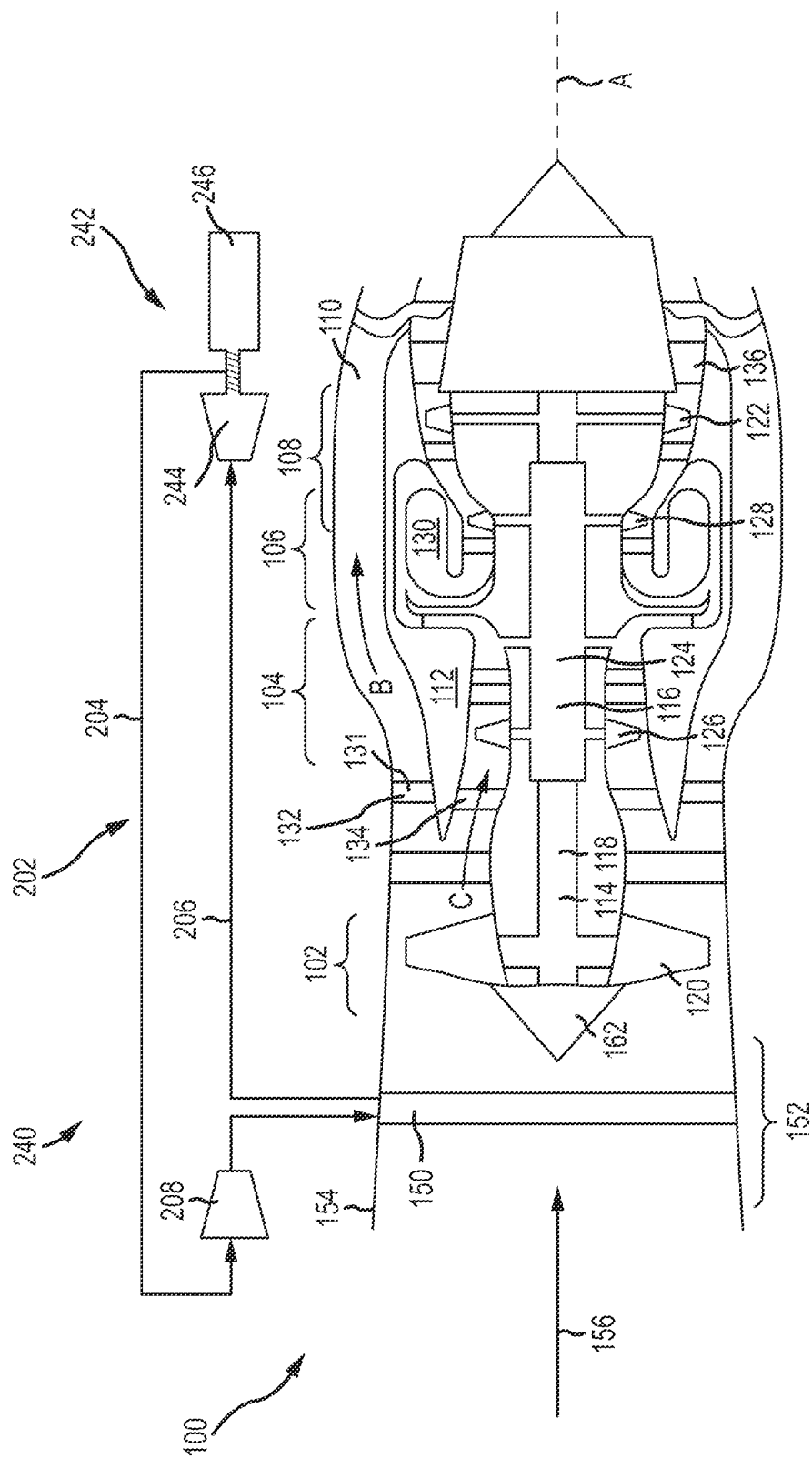

Referring now to FIG. 2D, a cooling circuit 240 for the inlet precooler 150 is illustrated. In various embodiments, the cooling circuit 240 includes the cooling fluid loop 202 having the cold loop 204 and the hot loop 206. The compressor 208 is configured to deliver the cooled cooling fluid from the cold loop 204 to the inlet precooler 150, where the cold cooling fluid is heated by the thermal energy of the inlet airstream 156 to produce the heated cooling fluid via a heat exchange process. The heated cooling fluid is then pumped by the compressor 208 to a turbogenerator 242, where the heated cooling fluid is expanded through a turbine 244 to drive a generator 246 (which may be considered an auxiliary power unit). Expansion of the heated cooling fluid over the turbine 244 cools the heated cooling fluid back to the cooled cooling fluid, which is then returned to the inlet precooler 150 by the compressor 208. The configuration of the cooling circuit 240 is essentially a closed loop circuit, with the cooling fluid being a supercritical or transcritical fluid as described above. In various embodiments, a heat exchanger (e.g., heat exchanger 216) is located within the cold loop 204, between the compressor 208 and the generator 2046. The heat exchanger may remove residual heat from the cold loop 204.

Figure 2E:
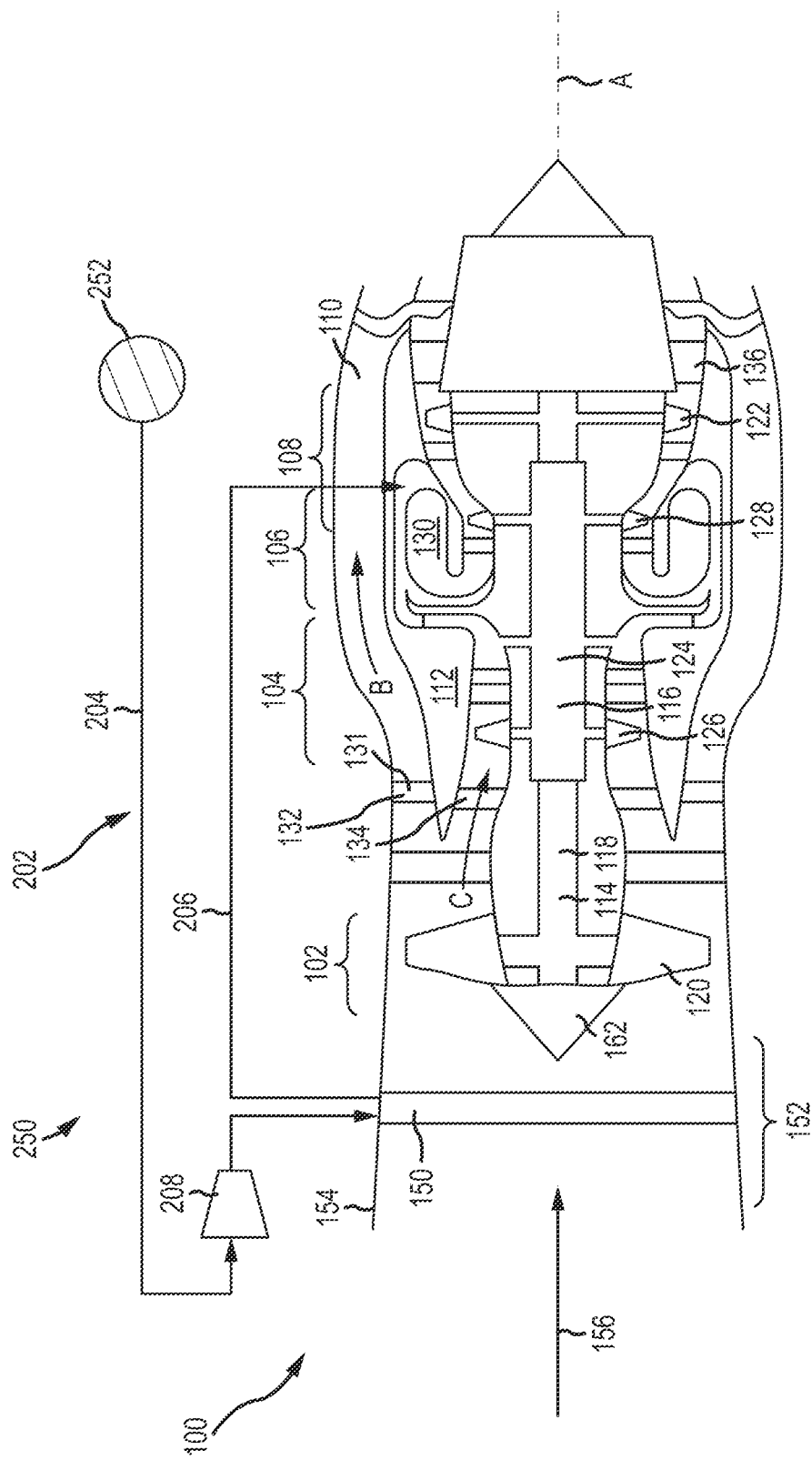

Referring now to FIG. 2E, a cooling circuit 250 for the inlet precooler 150 is illustrated. In various embodiments, the cooling circuit 250 includes the cooling fluid loop 202 having the cold loop 204 and the hot loop 206. The compressor 208 is configured to deliver the cooled cooling fluid from the cold loop 204 to the inlet precooler 150, where the cold cooling fluid is heated by the thermal energy of the inlet airstream 156 to produce the heated cooling fluid via a heat exchange process. The heated cooling fluid is then pumped by the compressor 208 to the combustor 130 where it is burned in the combustion process. In this embodiment, the cooling fluid is a fuel (or oil) from a tank 252 (e.g., a fuel tank within the wing of an aircraft) that is ultimately being delivered to the combustor 130. The heat exchange process occurring within the inlet precooler 150 beneficially preheats the fuel being delivered to the combustor 130. The configuration of the cooling circuit 250 is essentially an open loop circuit, with the cooling fluid being the fuel as described above, eliminating the need for a supercritical or transcritical fluid as the cooling fluid.

Figure 3A:
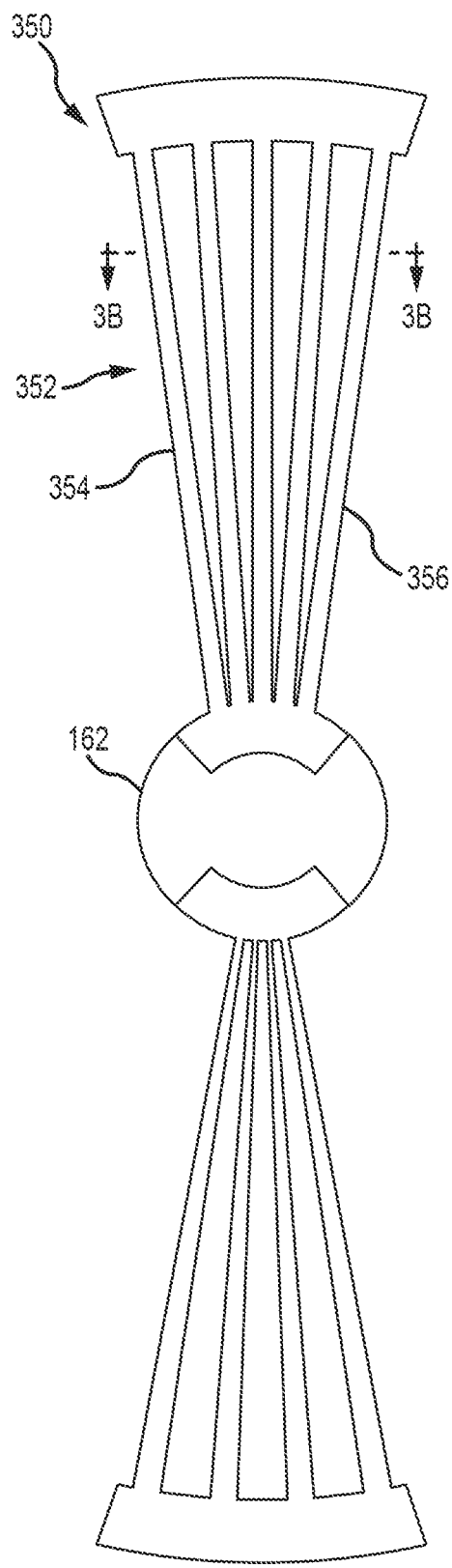
FIGS. 3A and 3B are axial and radial schematic sectional views of a precooler, in accordance with various embodiments.
Figure 3B:
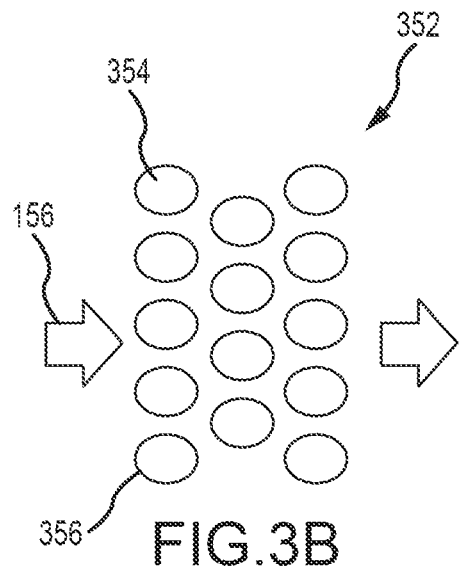

Referring now to FIGS. 3A and 3B, a sectional view of a precooler 350, similar to the inlet precooler 150 described above, is illustrated. The figures provide an axial or frontal view (FIG. 3A) and a radial view (FIG. 3B) of a section of the precooler 350, which, in various embodiments, extends a full 360° about the inlet duct 154; only a portion of the precooler 350 is illustrated in FIGS. 3A and 3B. The precooler 350 includes a plurality of tubes 352 extending radially from a region proximate an axial centerline extending (e.g., the central longitudinal axis A referred to above) through the inlet cone 162. As illustrated, the plurality of tubes 352 includes a first tube 354 and a second tube 356 through which the cooling fluid is routed or circulated, providing a heat exchange process between the cooling fluid (e.g., the cooled cooling fluid described above) and the thermal energy of the inlet airstream 156 to produce the heated cooling fluid. The precooler 350 may be employed with any of the cooling circuits described above with reference to FIGS. 2A-2E.

Figure 4A:
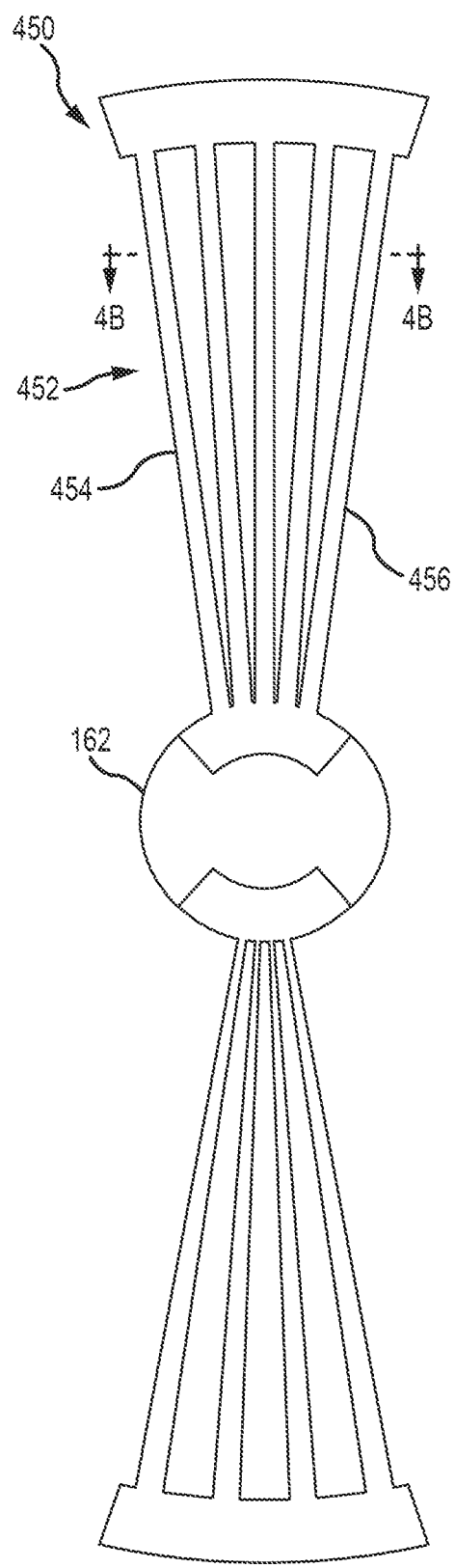
FIGS. 4A and 4B are axial and radial schematic sectional views of a precooler, in accordance with various embodiments.
Figure 4B:
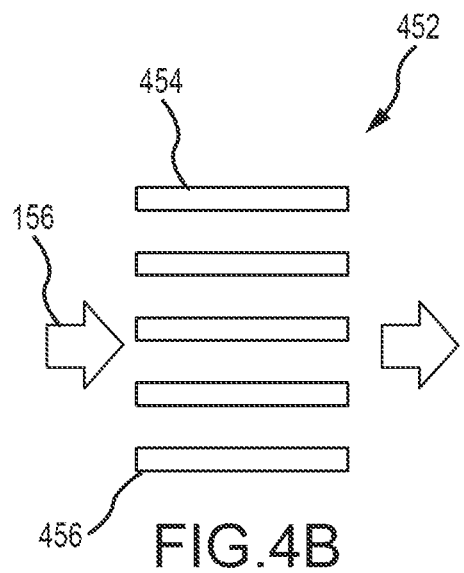

Referring now to FIGS. 4A and 4B, a sectional view of a precooler 450, similar to the inlet precooler 150 described above, is illustrated. The figures provide an axial or frontal view (FIG. 4A) and a radial view (FIG. 4B) of a section of the precooler 450, which, in various embodiments, extends a full 360° about the inlet duct 154; only a portion of the precooler 450 is illustrated in FIGS. 4A and 4B. The precooler 450 includes a plurality of baffles 452 (or axial extending tubes) extending radially from a region proximate an axial centerline extending (e.g., the central longitudinal axis A referred to above) through the inlet cone 162. As illustrated, the plurality of baffles 452 includes a first baffle 454 and a second baffle 456 through which the cooling fluid is routed or circulated, providing a heat exchange process between the cooling fluid (e.g., the cooled cooling fluid described above) and the thermal energy of the inlet airstream 156 to produce the heated cooling fluid. The precooler 450 may be employed with any of the cooling circuits described above with reference to FIGS. 2A-2E.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Finally, any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A gas turbine engine, comprising:
  a core engine, including a compressor section, a combustor section and a turbine section positioned within a core flow path of the gas turbine engine;
  a fan section positioned axially upstream of the compressor section, the fan section including a fan and an inlet cone positioned upstream of the fan;
  an inlet duct configured to house the fan section;
  an inlet precooler disposed within the inlet duct, the inlet precooler including a substantially flat structure positioned a fixed distance upstream of the inlet cone and a radially inner portion that surrounds a radially outer portion of the inlet cone; and
  a heat exchange system configured to provide a cooling fluid to the inlet precooler.

2. The gas turbine engine of claim 1, wherein the inlet precooler includes a cone-shaped structure, the cone-shaped structure defining an angle with respect to a radially extending plane positioned perpendicular to an engine central longitudinal axis.

3. The gas turbine engine of claim 2, wherein the angle is within a first range of about zero degrees to about sixty degrees.

4. The gas turbine engine of claim 3, wherein the angle is within a second range of about ten degrees to about fifty degrees.

5. The gas turbine engine of claim 1, wherein the heat exchange system includes a cooling circuit having a cold loop and a hot loop and a compressor configured to deliver a cooled cooling fluid to the inlet precooler and a heat exchanger configured to receive a heated cooling fluid from the inlet precooler and to produce the cooled cooling fluid via a heat exchange process.

6. The gas turbine engine of claim 1, wherein the heat exchange system includes a cooling circuit having a cold loop and a hot loop and a compressor configured to deliver a cooled cooling fluid to the inlet precooler and a turbogenerator configured to receive a heated cooling fluid from the inlet precooler and to produce the cooled cooling fluid via an expansion of the heated cooling fluid over a turbine section of the turbogenerator.

7. The gas turbine engine of claim 1, further comprising a high-speed spool and wherein the compressor section includes a high-pressure compressor and the turbine section includes a high-pressure turbine, the high-pressure compressor and the high-pressure turbine being interconnected via the high-speed spool.

8. The gas turbine engine of claim 7, further comprising a low-speed spool and wherein the compressor section includes a low-pressure compressor and the turbine section includes a low-pressure turbine, the low-pressure compressor and the low-pressure turbine being interconnected via the low-speed spool.

9. The gas turbine engine of claim 1, wherein the cooling fluid comprises a supercritical fluid or a transcritical fluid is circulated through the inlet precooler via a pump.

10. The gas turbine engine of claim 9, wherein the cooling fluid is selected to cool an inlet airstream to the inlet precooler to a temperature consistent with subsonic flight while flying at a supersonic speed.

11. The gas turbine engine of claim 10, wherein the cooling fluid is selected to cool the inlet airstream to the inlet precooler to about negative forty degrees Celsius at an altitude of about ten-thousand meters.

12. A turbofan engine, comprising:
a core engine, including a compressor section, a combustor section and a turbine section positioned within a core flow path of the turbofan engine;
a bypass splitter positioned radially outward of the core engine and configured to house the compressor section, the combustor section and the turbine section;
a bypass duct positioned radially outward of the bypass splitter;
a fan section positioned axially upstream of the compressor section, the fan section including a fan and an inlet cone positioned upstream of the fan;
an inlet duct configured to house the fan section;
an inlet precooler disposed within the inlet duct; and
a heat exchange system configured to provide a cooling fluid to the inlet precooler,
wherein the inlet precooler includes a radially inner portion that surrounds a radially outer portion of the inlet cone.

13. The turbofan engine of claim 12, wherein the inlet precooler includes a cone-shaped structure, the cone-shaped structure defining an angle with respect to a radially extending plane positioned perpendicular to an engine central longitudinal axis.

14. The turbofan engine of claim 13, wherein the angle is within a range of about zero degrees to about sixty degrees.

15. The turbofan engine of claim 12, wherein the heat exchange system includes a cooling circuit having a cold loop and a hot loop and a compressor configured to deliver a cooled cooling fluid to the inlet precooler and a heat exchanger configured to receive a heated cooling fluid from the inlet precooler and to produce the cooled cooling fluid via a heat exchange process.

16. The turbofan engine of claim 12, wherein the heat exchange system includes a cooling circuit having a cold loop and a hot loop and a compressor configured to deliver a cooled cooling fluid to the inlet precooler and a turbogenerator configured to receive a heated cooling fluid from the inlet precooler and to produce the cooled cooling fluid via an expansion of the heated cooling fluid over a turbine section of the turbogenerator.

17. The turbofan engine of claim 12, wherein the cooling fluid comprises a supercritical fluid or a transcritical fluid is circulated through the inlet precooler via a pump.

18. The turbofan engine of claim 17, wherein the cooling fluid is selected to cool an inlet airstream to the inlet precooler to a temperature consistent with subsonic flight while flying at a supersonic speed.

* * * * *